Aug. 2, 1966
G. E. DUNN
3,263,445
UNIVERSAL JOINT
Filed Oct 21, 1965
3 Sheets-Sheet 1
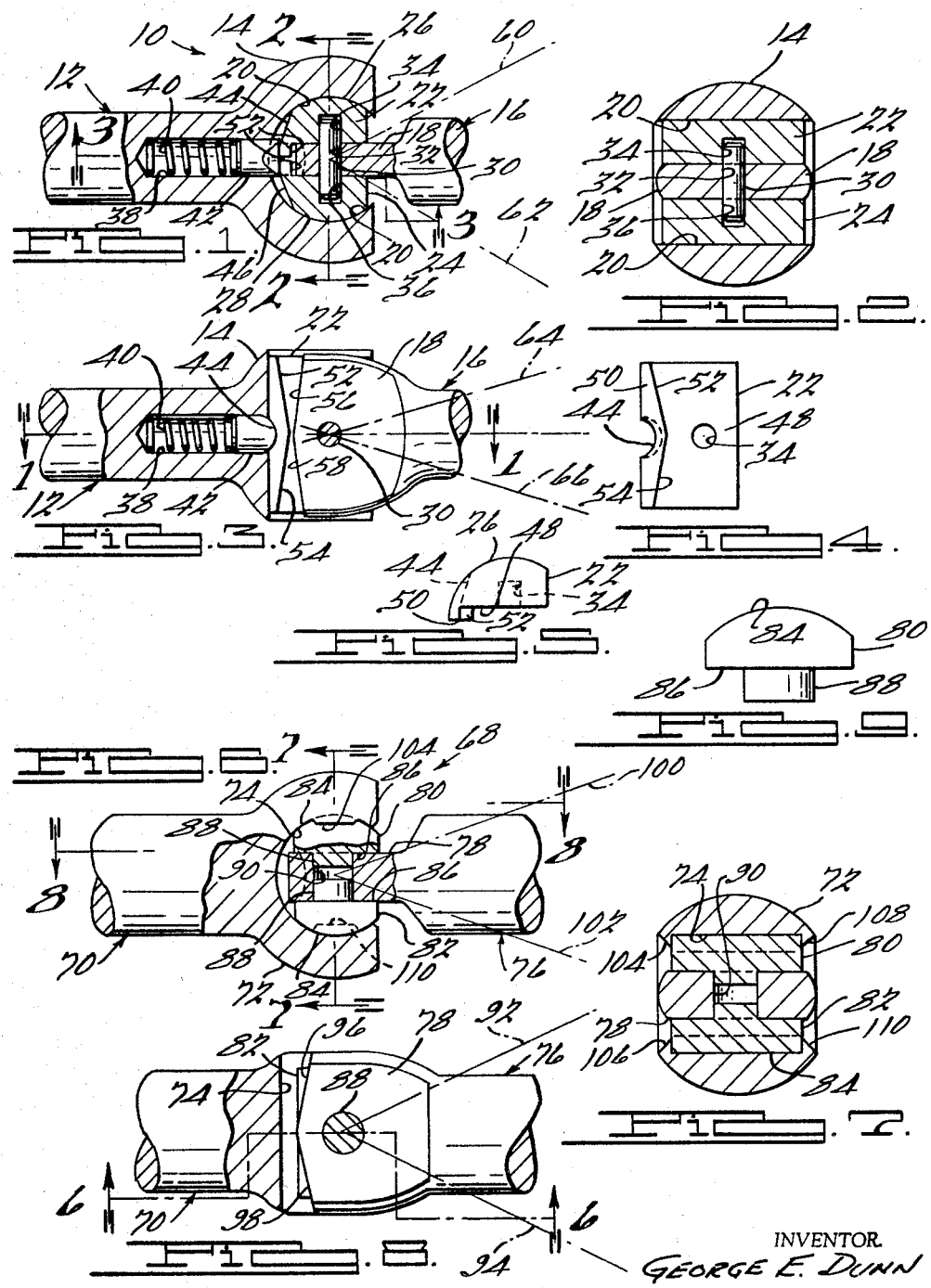
INVENTOR.
GEORGE E. DUNN
BY Harness & Harris
ATTORNEYS.

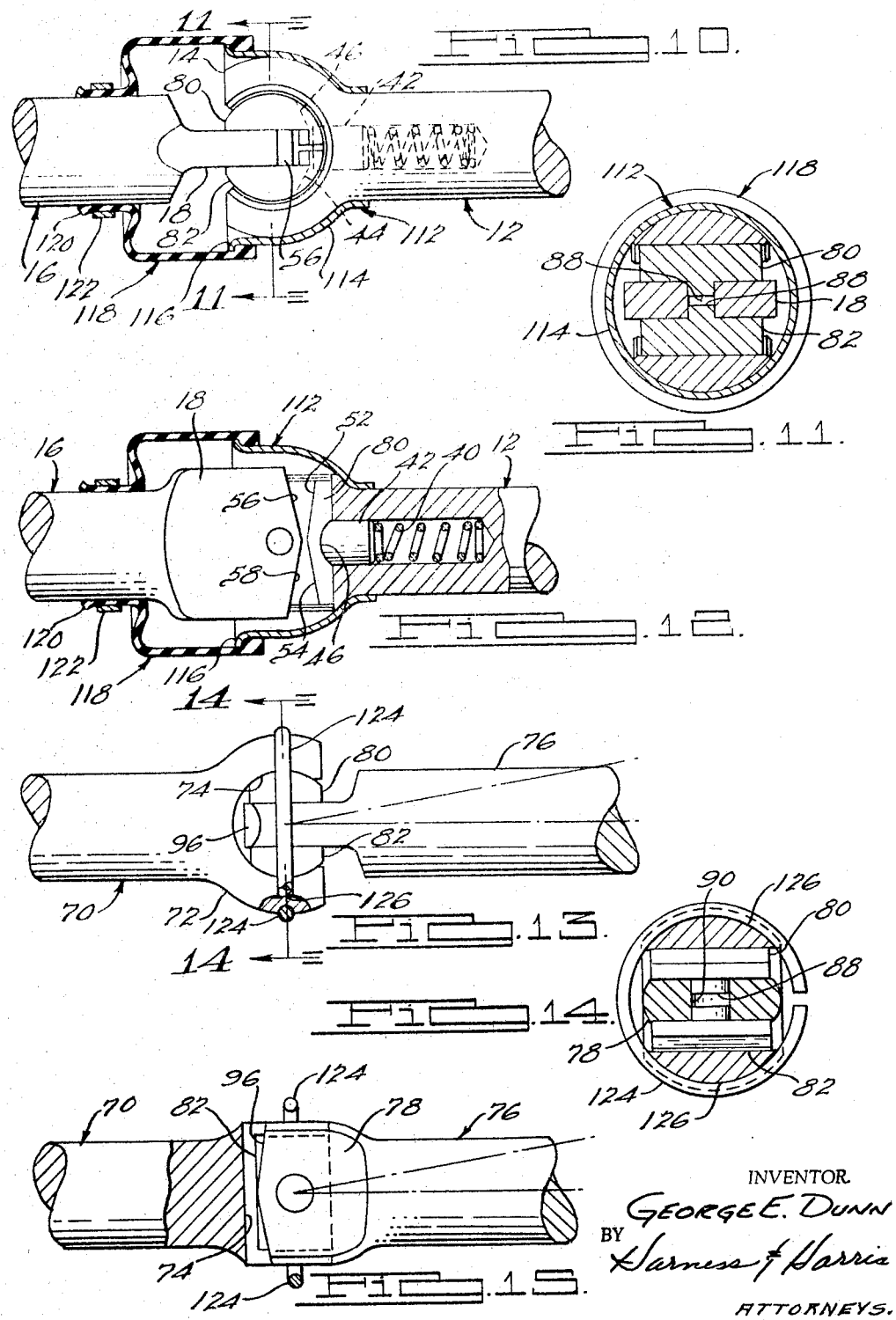

Aug. 2, 1966  G. E. DUNN  3,263,445

UNIVERSAL JOINT

Filed Oct. 21, 1965  3 Sheets-Sheet 3

INVENTOR.
GEORGE E. DUNN
BY Harness & Harris
ATTORNEYS.

United States Patent Office 3,263,445
Patented August 2, 1966

3,263,445
UNIVERSAL JOINT
George E. Dunn, Orchard Lake, Mich., assignor to Chrysler Corporation, Highland Park, Mich., a corporation of Delaware
Filed Oct. 21, 1965, Ser. No. 499,751
4 Claims. (Cl. 64—7)

This invention relates to a universal joint comprised of a driving and driven member arranged with respect to each other so as to provide a generally articulated operating drive therebetween.

This application is a continuation-in-part of my co-pending application Serial Number 302,091, filed August 14, 1963.

Many universal joints constructed in accordance with the prior art lack sufficient working bearing areas which causes rapid wear within the joint and often contributes to the early failure thereof. Various arrangements have, heretofore, been proposed for increasing the bearing areas; however, such proposals have usually required the cooperating elements to assume configurations which are relatively difficult to produce with conventional machining processes.

Accordingly, an object of this invention is to provide a novel and improved universal joint possessing relatively large bearing surfaces.

Another object of this invention is to provide a novel and improved universal joint comprised of elements which are readily produced by conventional machining processes.

A further object of this invention is to provide a universal joint which possesses relatively large bearing surfaces provided by relatively simple elements, comprising the joint, which are readily manufactured and easily assembled to form an operating universal joint.

Other objects and advantages of this invention will become apparent when reference is made to the following description considered in conjunction with the accompanying drawings wherein:

FIGURE 1 is a longitudinal sectional view through one embodiment of the invention taken generally on the plane of line 1—1 of FIGURE 3;

FIGURE 2 is a cross-sectional view taken generally on line 2—2 of FIGURE 1;

FIGURE 3 is a sectional view taken on the plane of line 3—3 of FIGURE 1;

FIGURE 4 is a side elevational view of one of the elements comprising the invention of FIGURES 1–3;

FIGURE 5 is a top plan view of the element shown in FIGURE 4;

FIGURE 6 is a longitudinal cross-sectional view through another embodiment of the invention taken generally on the plane of line 6—6 of FIGURE 8;

FIGURE 7 is a cross-sectional view taken on the plane of line 7—7 of FIGURE 6;

FIGURE 8 is a sectional view taken substantially on the plane of line 8—8 of FIGURE 6;

FIGURE 9 is a somewhat enlarged view of one of the elements comprising the invention as illustrated by FIGURES 6–8;

Figure 16:
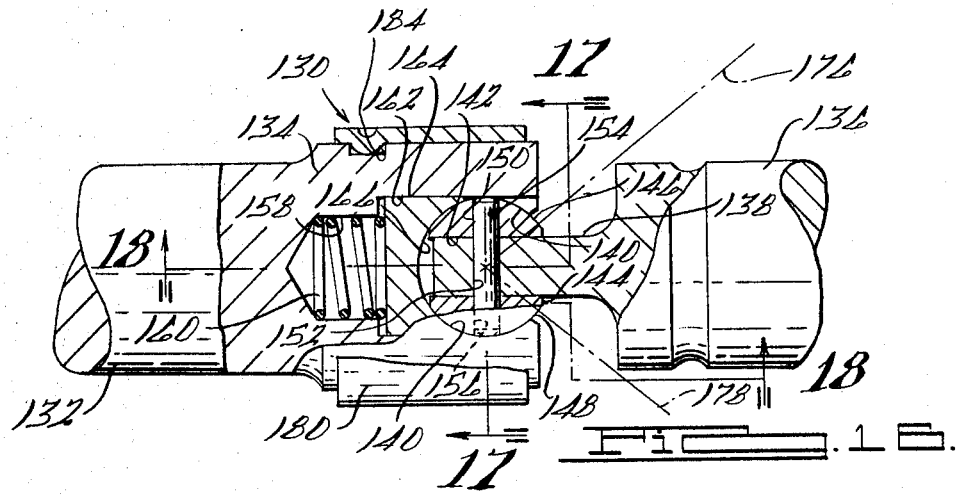
Figure 17:
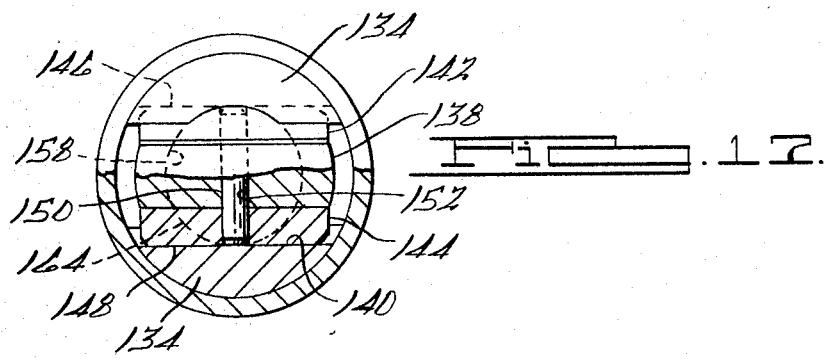
Figure 18:
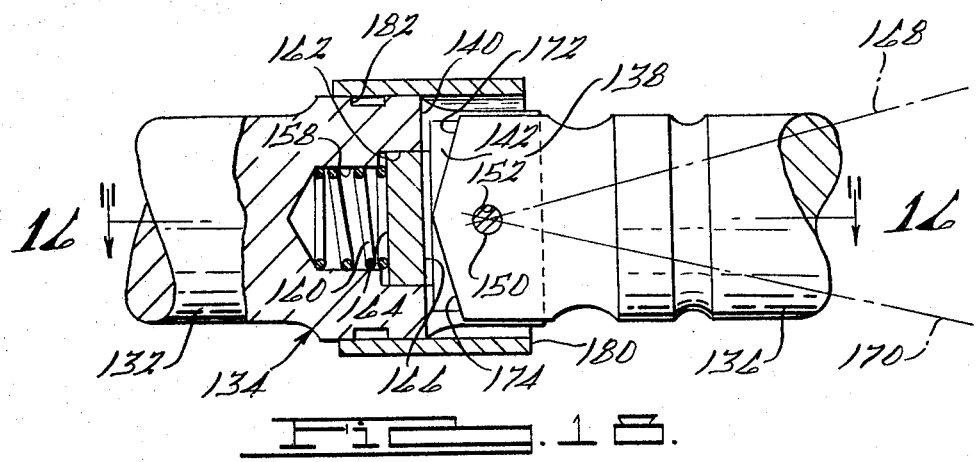

FIGURES 10–15 are views similar to FIGURES 1, 2, 3, 6, 7 and 8, respectively, illustrating further modifications of the invention; and FIGURES 16, 17 and 18 are views similar to FIGURES 1, 2 and 3, respectively, illustrating another embodiment of the invention.

Referring now in greater detail to the drawings, FIGURE 1 illustrates a universal joint comprised of a shaft member 12 provided with a yoke portion 14 which is operatively connected to a second shaft 16 which is provided with a tang 18. Either of shafts 12 or 16 may of course be the drive member.

Yoke 14 is machined, as for example by broaching, in order to form an inner cylindrical surface 20. Individual shoe members 22 and 24 having complementary cylindrical surfaces 26 and 28 formed respectively thereon are slidably received within cylindrical surface 20. A pivot pin 30 received transversely through an aperture 32 formed in tang 18 has its opposite ends retained within apertures 34 and 36 formed in shoes 22 and 24, respectively.

A counterbore 38, formed in shaft 12, is adapted to receive therein a spring 40 and detent or key 42. Key 42 is continually urged by spring 40 into recesses 44 and 46, of annular cross-section, formed respectively in shoes 22 and 24.

Each of the shoes 22 and 24, as illustrated by shoe 22 of FIGURES 4 and 5, is provided at its inner surface 48 with a protruding portion 50 having generally vertically disposed surfaces 52 and 54 angularly disposed with respect to each other. Preferably, the extreme end of tang 18 is also provided with vertically inclined surfaces 56 and 58. Shoes 22 and 24 are preferably formed of sintered metal which is impregnated with a suitable lubricant.

Relative angular movement of shafts 12 and 16, as illustrated generally by the centerlines 60 and 62, is permitted by the cooperating cylindrical surfaces 20, 26 and 28 whereas relative angular movement as depicted by centerlines 64 and 66 of FIGURE 3 is made possible by pivot pin 30 and the apertures formed in the shoes 22, 24 and tang 18.

It should be noted that the angular displacement of the respective shafts, as viewed in FIGURE 3, is limited by the coaction of surfaces 52 and 54 with surfaces 56 and 58, respectively. That is, when the shafts 12 and 16 attain a predetermined angular relationship with respect to each other, as for example a position indicated by centerline 64, surfaces 52 and 56 abut against each other thereby effectively preventing further angular displacement in that plane. Likewise, relative angular displacement in the plane of FIGURE 1 is effectively limited by the yoke portion 14.

Referring to FIGURE 1, as shaft 16 is rotated clockwise, spring 40 continually urges key 42 against the annular recess 46; also as shaft 16 is rotated counterclockwise key 42 is maintained in engagement with recess 44. Accordingly, key 42 continuously maintains shoes 22 and 24 in engagement with surface 20, so as to compensate for any possible wear therebetween and at the same time inhibits relative axial motion between the shoes and the cylindrical surface 20.

FIGURES 6 through 9 illustrate a second embodiment of a universal joint 68 constucted in accordance with the invention as being comprised of a shaft 70 provided with a yoke portion 72 having a cylindrical opening 74 formed therethrough, as by broaching. A second shaft 76 has a tang 78 formed at one end thereof received generally within said cylindrical opening 74 and retained therein as by oppositely disposed shoes 80 and 82.

Each of the shoes is provided with an outwardly directed complementary cylindrical surface 84, which coact with the cylindrical surface 74 to permit relative angular displacement of shafts 70 and 76 in the plane of FIGURE 6, and inwardly directed surfaces 86 which serve to confine tang 78 therebetween. Each of the shoes, as also shown in FIGURE 9, are provided with a cylindrical projection 88 extending from the inner surface 86 which when received in aperture 90 formed in tang 78 cooperate to serve as a pivot.

Relative angular movement between shafts 70 and 76, as indicated generally by centerlines 92 and 94 of FIGURE 8, is limited by abutment of the internal cylindrical surface 74 and one of the generally vertically directed surfaces 96 and 98 formed on the end of tang 78. Also, similar to the embodiment of FIGURE 1, relative angular displacement of the shafts 70 and 76, as indicated generally by the ceinterlines 100 and 102 of FIGURE 6, is limited as by the abutment of tang 78 against the yoke portion 72.

Bearing shoes 80 and 82 are preferably formed of sintered metal and impregnated with a suitable lubricant. In addition to providing relatively large bearing surfaces, shoes 80 and 82 present another important advantage. That is, the shoes are substantially identical to each other thereby permitting the use thereof on either side of tang 78. Relative movement of the shoes 80 and 82 axially of the cylindrical surface 74 is effectively prevented by means of abutment portions 104, 106, 108 and 110 formed as by staking of the yoke portion 72.

FIGURES 10–15 illustrate further modifications of the invention. Elements which are like or similar to those of FIGURES 1–9 are identified with like reference numbers.

The modification of FIGURES 10–12 illustrates the universal joint as being provided with a cup-like retainer or reinforcing member 112 having a portion 114 of generally spherical configuration which closely receives a portion of shaft 12 and yoke 14. The cup-like member 112 being a single continuous piece serves to absorb some of the forces incurred during operation and to a great extent prevent separation of the yoke 14 as might occur during periods of heavy load transmission through the joint. Further, a generally radially extending lip 116 formed on retainer 112 serves to hold one end of a generally tubular seal 118 which, preferably, has its other end 120 secured about shaft 16 as by a suitable strap 122.

The embodiment of FIGURES 13, 14 and 15, instead of being staked portions 104, 106, 108 and 110, is provided with a resilient snap ring 124 received in an arcuate groove 126 formed generally about the outer surface of yoke 72. Snap ring 124 is, of course, a means for preventing undesirable relative movement of shoes 80 and 82 axially of the cylindrical bearing opening 74.

FIGURES 16, 17 and 18 illustrate a further modification of the invention as shown by FIGURES 1, 2 and 3 and FIGURES 10, 11 and 12. Referring to FIGURE 16, a universal joint 130 is illustrated as comprising a shaft member 132 provided with a yoke portion 134 which is operatively connected to a second shaft 136 which is provided with a tang 138. Either of shafts 132 or 136 may of course be the drive member.

Yoke 134 is machined, as for example by broaching, in order to form an inner cylindrical surface 140. Individual shoe members 142 and 144 having complementary cylindrical surfaces 146 and 148 formed respectively thereon are slidably received within cylindrical surface 140. A pivot pin 150 received transversely through an aperture 152 formed in tang 138 has its opposite ends retained within apertures 154 and 156 formed in shoes 142 and 144, respectively.

Shaft 132 has a counterbore 158 formed generally coaxially therein which is adapted to receive a compression spring 160. A second counterbore 162, also formed coaxially in shaft 132, is adapted to slidably receive a plunger like wear block 164. When viewed as in FIGURE 17, it can be seen that the wear or bearing block 154 is circular or generally cylindrical. However, when viewed in FIGURES 16 and 17 it can be seen that bearing 164 is also provided with a generally cylindrical surface 166 which is complementary to cylindrical surfaces 146 and 148 of shoes 142 and 144, respectively.

Relative angular movement between shafts 132 and 136, as indicated by centerlines 168 and 170 of FIGURE 18, is limited by abutment of the internal cylindrical surface 140 and one of generally vertically directed surfaces 172 and 174 formed on the end of tang 138. Also, similar to the embodiment of FIGURE 1, relative angular displacement of shafts 132 and 136, as indicated by centerlines 176 and 178 of FIGURE 16, is limited by the abutment of tang 138 against the yoke portion 134.

A tubular restraining ring 180 is preferably tightly received about the yoke portion 134 so as to reinforce the yoke portion 134 and at the same time prevent disassembly of the elements comprising the universal joint assembly. As indicated in FIGURE 16, an annular recess 182 is preferably formed about yoke 134 and a portion 184 of ring 180 is deformed so as to be received within the recess.

In addition to the various embodiments and modifications of the invention disclosed and described, it is apparent that other embodiments and modifications of the invention are possible within the scope of the appended claims.

I claim:

1. A universal joint comprising a drive member and a driven member, one of said members having formed thereon a yoke portion with a cylindrical opening formed therethrough, the other of said members having formed thereon a tang portion received generally within said cylindrical opening, first and second shoe members respectively received between opposite sides of said tang and said cylindrical opening, pivot means operatively joining said tang and said shoe members for enabling rotative motion of said other member about the axis of said pivot means in a plane passing generally through the axis of said cylindrical opening, and additional means carried by said one member for urging said shoe members into engagement with the surface of said cylindrical opening, said additional means comprising resiliently deformable means and a bearing member continually urged by said deformable means into engagement with at least one of said shoe members, said bearing member being provided with a cylindrical surface of a curvature substantially equal to the curvature of said cylindrical opening.

2. A universal joint comprising a drive member and a driven member, one of said members having formed thereon a yoke portion with a cylindrical opening formed therethrough, the other of said members having formed thereon a tang portion received generally within said cylindrical opening, first and second shoe members respectively received between opposite sides of said tang and said cylindrical opening, pivot means operatively joining said tang and said shoe members for enabling rotative motion of said other member about the axis of said pivot means in a plane passing generally through the axis of said cylindrical opening, and resilient means carried by said one member resiliently urging at least one of said shoe members into engagement with the surface of said cylindrical opening, said resilient means comprising a resilient member carried by said one member, and a bearing member having a cylindrical bearing surface, said bearing member being constrained by said one member so as to be continually urged by said resilient member in a direction causing said bearing member bearing surface to engage at least one of said shoe members.

3. A universal joint comprising a drive member and a driven member, one of said members having formed thereon a yoke portion with a cylindrical opening formed therethrough, the other of said members having formed thereon a tang portion received generally within said cylindrical opening, first and second shoe members respectively received between opposite sides of said tang and said cylindrical opening, pivot means operatively joining said tang and said shoe members for enabling rotative motion of said other member about the axis of said pivot means in a plane passing generally through the axis of said cylindrical opening, and resilient means carried by said one member resiliently urging at least one of said shoe members into engagement with the surface of said cylindrical opening, said resilient means including a bearing block provided with a cylindrical bearing surface held in continuous engagement with at least one of said shoe members.

4. A universal joint comprising a drive member and a driven member, a yoke portion formed on one of said members having a cylindrical opening formed therethrough receiving therein one end of the other of said members, first and second shoe members respectively received between opposite sides of said one end and the surface of said cylindrical opening, each of said shoe members being formed to have a complementary surface engaging the surface of said cylindrical opening, pivot means having an axis generally transverse to the axis of said cylindrical opening operatively joining said one end to said shoe members, abutment surfaces formed on said one end adapted for alternate engagement with said surface of said cylindrical opening, a bore formed in said yoke portion and directed axially of said one of said members, a compression spring received within said bore, and a bearing member received in said bore and abutting against said spring, said bearing member being provided with a cylindrical bearing surface for engaging at least one of said shoe members so as to continually urge said shoe members into engagement with said surface of said cylindrical opening.

References Cited by the Examiner
UNITED STATES PATENTS

| | | | |
|---|---|---|---|
| 1,359,354 | 11/1920 | Geer | 64—7 |
| 1,949,859 | 3/1934 | Charles | 64—7 |
| 2,153,093 | 4/1939 | Magee et al. | 64—7 |

MILTON KAUFMAN, *Primary Examiner.*

HALL C. COE, *Examiner.*